United States Patent
Barroca

(10) Patent No.: US 7,913,951 B2
(45) Date of Patent: Mar. 29, 2011

(54) LINKING ASSEMBLY BETWEEN A MECHANICAL SYSTEM AND AN ADJUSTMENT ACTUATOR COMPRISING ENGAGEMENT/DISENGAGEMENT MEMBERS

(75) Inventor: Marcel Barroca, Brives (FR)

(73) Assignee: Societe Industrielle Et Commerciale de Material Aeronautique—SICMA Aero Seat (FR)

( * ) Notice: Subject to any disclaimer, the term of this patent is extended or adjusted under 35 U.S.C. 154(b) by 944 days.

(21) Appl. No.: 11/804,205

(22) Filed: May 17, 2007

(65) Prior Publication Data

US 2008/0105784 A1    May 8, 2008

(30) Foreign Application Priority Data

May 19, 2006    (FR) ...................... 06 04526

(51) Int. Cl.
*B64D 25/00*    (2006.01)
(52) U.S. Cl. ................. 244/122 R; 244/118.6
(58) Field of Classification Search .............. 244/122 R, 244/118.6; 297/344.11
See application file for complete search history.

(56) References Cited

U.S. PATENT DOCUMENTS

| | | | |
|---|---|---|---|
| 2,164,715 A | 7/1939 | Krainbill | |
| 3,910,632 A | 10/1975 | Marechal | |
| 4,930,841 A | 6/1990 | Wittig | |
| 5,344,210 A | 9/1994 | Marwan et al. | |
| 5,788,183 A | 8/1998 | Marechal | |
| 6,000,659 A | 12/1999 | Brauer | |
| 6,059,364 A | 5/2000 | Dryburgh et al. | |
| 6,095,609 A * | 8/2000 | Magadanz | 297/378.12 |
| 6,119,980 A * | 9/2000 | Ferry | 244/122 R |
| 6,267,445 B1 | 7/2001 | Marais | |
| 6,669,141 B2 | 12/2003 | Schmidt-Schaeffer | |
| 6,733,080 B2 | 5/2004 | Stumpf et al. | |
| 7,025,306 B2 | 4/2006 | Saint Jalmes | |
| 7,178,871 B1 | 2/2007 | Round et al. | |
| 7,229,133 B2 * | 6/2007 | Maddelein et al. | 297/362.13 |
| 7,318,622 B2 | 1/2008 | Rezag et al. | |
| D583,579 S | 12/2008 | Pearson et al. | |
| 7,469,861 B2 | 12/2008 | Ferry et al. | |
| 7,472,957 B2 | 1/2009 | Ferry et al. | |
| 7,517,010 B2 | 4/2009 | Saint-Jalmes et al. | |
| 7,523,888 B2 | 4/2009 | Ferry et al. | |
| 7,578,470 B2 | 8/2009 | Plant | |
| 7,578,471 B2 | 8/2009 | Beroth | |
| 2001/0015566 A1 | 8/2001 | Park et al. | |
| 2002/0003370 A1 | 1/2002 | Menard | |
| 2002/0109379 A1 | 8/2002 | Marechal et al. | |

(Continued)

FOREIGN PATENT DOCUMENTS

EP    1495908    1/2005

(Continued)

*Primary Examiner* — Christopher P Ellis
(74) *Attorney, Agent, or Firm* — Dean W. Russell; Kilpatrick Townsend & Stockton LLP

(57) ABSTRACT

The invention relates to a linking assembly between a mechanical system, such as an aircraft seat, and an adjustment actuator, comprising an input shaft connected to an output of the actuator and an output shaft connected to an input of the mechanical system, and engagement/disengagement members placed between the input shaft and the output shaft, the members being mobile between a locked position, wherein the input shaft and the output shaft cooperate in rotation, and an unlocked position, position-copying means being mounted solidly attached to the actuator, the copying means having an input shaft, a position-copying rod being fixed between the output shaft and the input shaft of the copying means.

10 Claims, 1 Drawing Sheet

U.S. PATENT DOCUMENTS

| | | |
|---|---|---|
| 2003/0075964 A1 | 4/2003 | Piaulet et al. |
| 2003/0189360 A1 | 10/2003 | Laurent |
| 2004/0099766 A1 | 5/2004 | Pratt, Jr. |
| 2004/0217642 A1 | 11/2004 | Herault |
| 2004/0262969 A1* | 12/2004 | Sasaki et al. ............ 297/344.11 |
| 2005/0189804 A1 | 9/2005 | Mercier |
| 2006/0011005 A1 | 1/2006 | Wisner et al. |
| 2007/0029444 A1 | 2/2007 | Mercier et al. |
| 2007/0034742 A1 | 2/2007 | Jaeger et al. |
| 2007/0164157 A1 | 7/2007 | Parki |
| 2007/0246981 A1 | 10/2007 | Plant |
| 2009/0084897 A1 | 4/2009 | Ferry et al. |
| 2009/0146004 A1 | 6/2009 | Plant |
| 2009/0146006 A1 | 6/2009 | Park et al. |
| 2009/0243352 A1 | 10/2009 | Cailleteau |
| 2009/0302158 A1 | 12/2009 | Darbyshire et al. |
| 2010/0019086 A1 | 1/2010 | Ferry et al. |
| 2010/0025530 A1 | 2/2010 | Ferry et al. |
| 2010/0038484 A1 | 2/2010 | Ersan |
| 2010/0038485 A1 | 2/2010 | Harcup |

FOREIGN PATENT DOCUMENTS

| | | |
|---|---|---|
| EP | 1817228 | 5/2006 |
| EP | 1963132 | 6/2007 |
| EP | 2154067 | 2/2010 |
| FR | 2620232 | 3/1989 |
| FR | 2 748 240 | 11/1997 |
| GB | 2362095 | 11/2001 |
| WO | WO 2007/042740 | 4/2007 |
| WO | WO-2009077717 | 6/2009 |
| WO | WO-2010018367 | 2/2010 |

* cited by examiner

LINKING ASSEMBLY BETWEEN A MECHANICAL SYSTEM AND AN ADJUSTMENT ACTUATOR COMPRISING ENGAGEMENT/DISENGAGEMENT MEMBERS

CROSS REFERENCE TO RELATED APPLICATIONS

This application claims priority to French Patent Application No. 0604526, filed May 19, 2006, which is incorporated by reference herein.

BACKGROUND AND SUMMARY

The present invention relates to a linking assembly between a mechanical system, such as an aircraft seat, and an adjustment actuator, as well as an aircraft comprising such a linking assembly.

The adjustment actuators are provided to adjust the position of the seat. The linking assembly between the seat and the actuator generally comprises an input shaft connected to an output of said actuator and an output shaft connected to an input of said mechanical system, the shafts cooperating with each other to transmit the movement from the actuator to the seat. Disengagement means are generally associated with the adjustment actuator in order to suppress the cooperation between the input shaft and the output shaft, in particular with a view to performing maintenance operations on the seat.

It is also known to have means for copying the position of the seat when this position is changed and it is desirable to return this seat to a pre-adjusted position. However, when the seat is separated from the actuator by the disengagement means, the function to copy the position of the seat is lost and new adjustments are required. The invention aims to solve this disadvantage by providing a linking assembly between a mechanical system, such as an aircraft seat, and an adjustment actuator comprising engagement/disengagement means and position-copying means in which the copying function is not lost when the linking assembly is disengaged.

For this purpose and according to a first aspect, the invention relates to a linking assembly between a mechanical system, such as an aircraft seat, and an adjustment actuator, comprising an input shaft connected to an output of said actuator and an output shaft connected to an input of said mechanical system, and engagement/disengagement members placed between the input shaft and the output shaft, said members being mobile between a locked position, wherein the input shaft and the output shaft cooperate in rotation, and an unlocked position, wherein the input shaft does not cooperate with the output shaft, position-copying means being solidly attached to said actuator, said copying means having an input shaft, a position-copying rod being fixed between said output shaft and the input shaft of said copying means. Since the engagement/disengagement members are not integrated in the actuator, it is possible to provide a direct link between the position-copying means and the output shaft of the mechanical system, which makes it possible to conserve the function that copies the position of the mechanical system after disengaging the linking assembly.

According to one embodiment of the invention, said input and output shafts of said assembly are substantially coaxial, the input shaft being inserted in a first axial bore of the output shaft, said input shaft of the assembly comprising a second axial bore, and said position-copying rod passing through said second axial bore. According to one embodiment of the invention, said engagement/disengagement members comprise at least one housing made in the input shaft of the assembly and at least one orifice passing through the output shaft, the orifice being placed opposite the housing, at least one locking member being mobile in radial translation between a locking position, wherein said member is placed in the housing and the orifice in order solidly to attach the input shaft and the output shaft, and an unlocking position, wherein said member is removed from the housing in order to separate the input shaft from the output shaft. According to a second aspect, the invention relates to an aircraft comprising at least one assembly such as described above, associated with at least one seat of said aircraft. Other aspects and advantages of the invention will appear throughout the following detailed description, made in reference to the appended figures.

DETAILED DESCRIPTION

Figure 1:
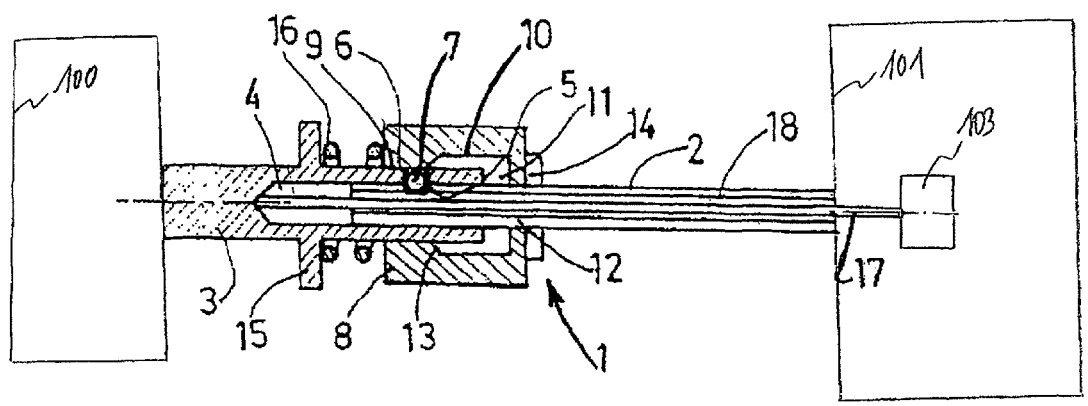
FIG. 1 is a partial schematic cross-section view of a linking assembly according to the invention, the engagement/disengagement system being in locked position.

In reference to the figures, a linking assembly 1 between a mechanical system 100 such as an aircraft seat, and an adjustment actuator 101 is described. The linking assembly 1 comprises an input shaft 2 connected to an output of said actuator 101 and an output shaft 3 connected to an input of said mechanical system 100. In the normal operation of the assembly, the input shaft 2 and the output shaft 3 cooperate in rotation so as to transmit a rotational movement of the actuator 101 to the mechanical system 100. For this purpose, the input 2 and output shafts 3 are substantively coaxial and the output shaft 3 comprises a first axial bore 4 in which the input shaft 2 is inserted.

Engagement/disengagement members are provided between the input shaft 2 and the output shaft 3. These members are mobile between a locked position, wherein the input shaft 2 and the output shaft 3 cooperate in rotation, and an unlocked position, wherein the input shaft 2 does not cooperate with the output shaft 3 so as to be able to separate the output shaft 3 from the actuator 101 in order, for example, to perform maintenance operations on the mechanical system 100.

The engagement/disengagement members comprise at least one housing 5 made in the input shaft 2 of the linking assembly and at least one orifice 6 passing through the output shaft 3. A locking member 7 is mobile in radial translation between a locking position (FIG. 1), wherein the orifice 6 is placed opposite the housing 5 and wherein the member 7 is placed in the housing 5 and the orifice 6 so as solidly to attach the input shaft 2 and the output shaft 3, and an unlocking position (FIG. 2), wherein the member 7 is removed from the housing 5 so as to separate the input shaft 2 and the output shaft 3. The locking member 7 consists, for example, of a ball. According to different embodiments of the invention, it is possible to provide a plurality of locking members 7, each placed in corresponding housings and orifices.

The engagement/disengagement members furthermore comprise a control ring 8 placed around the input shaft 2 and the output shaft 3. The control ring 8 comprises a locking inner wall portion 9 with a diameter that is substantially equal to that of the output shaft 3 and an unlocking inner wall portion 10 with a diameter that is greater than that of the output shaft 3. The unlocking inner wall portion 10 thus forms a housing 11 that extends around a part of the output shaft 3. The control ring 8 has an axial bore 12, and end part of which has a diameter that is substantially equal to the diameter of the output shaft 3 in the proximity of the locking wall portion 9 and the other end part of which has a diameter that is substantially equal to that of the input shaft 2, the edges of the bore 12 in this end part closing off the housing 11. The input shaft 2 is inserted in the ring 8 on the housing 11 side and the output shaft 3 is inserted in the ring 8 on the side of the locking wall portion 9.

The control ring 8 is mobile in axial translation between a locking position (FIG. 1), wherein the locking inner wall portion 9 is placed opposite the orifice 6 so as to hold the locking member 7 in the housing 5, and an unlocking position (FIG. 2), wherein the unlocking inner wall portion 10 is placed opposite the orifice 6 so as to allow the locking member 7 to come out of the housing 5 towards the housing 11. The locking member 7 comes out by rotation of the input shaft 2 when the control ring 8 is in unlocking position. The control ring 8 furthermore comprises a slope 13 connecting the locking inner wall portion 9 to the unlocking inner wall portion 10. The slope 13 makes it possible to bring the locking member 7 into its locking position by making the control ring 8 pass from its unlocking position to its locking position and by making the input shaft 2 turn so as to place the housing 5 opposite the orifice 9.

Figure 2:
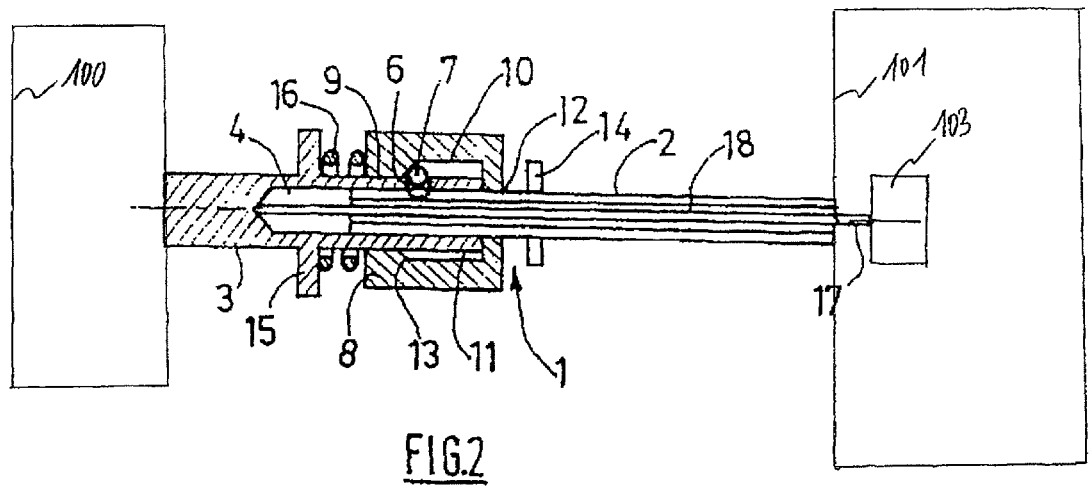
FIG. 2 is a partial schematic cross-section view of the assembly of FIG. 1, the engagement/disengagement system being in unlocked position.

The control ring 8 is mounted between a radial stop 14 of the outer wall of the input shaft 2 and a radial stop 15 of the outer wall of the output shaft 3, the stops 14 and 15 being spaced so as to allow the ring 8 to move between its locking position and its unlocking position. A spring 16 is mounted between the control ring 8 and the surface of the radial stop 15 of the output shaft 3. The spring 16 is compressed when the control ring 8 enters its unlocking position (FIG. 2) and pushes the ring 8 against the stop 14 when it enters its locking position (FIG. 1). The movement of the control ring 8 can be controlled by a control system (not shown) with an index pin on the control ring 8, connected to a control cable (not shown).

The mechanical system 100 is associated with means 103 for copying the position of the mechanical system. These means are, for example, traditionally made up of a potentiometer (not shown) comprising an input shaft associated with a substantially rigid position-copying rod 17. The input shaft of the copying means 103 is substantially coaxial to the input 2 and output shafts 3. The position-copying rod 17 is fixed to the output shaft 3 of the linking assembly 1. For this purpose, the input shaft 2 comprises a second axial bore 18 which the rod 17 passes through as far as the output shaft 3, as shown in the figures. In this way, the engagement/disengagement members have no influence on the position-copying means 103 and the position-copying function is not lost when the assembly is disengaged. The linking assembly 1 according to the invention can be implemented in an aircraft, for example, at the level of the seats thereof.

The invention claimed is:

1. An assembly comprising:
    a mechanical system having an input and including an aircraft seat;
    an adjustment actuator having an output; and
    a linking assembly comprising an input shaft connected to the output of the actuator and an output shaft connected to the input of the mechanical system, and engagement/disengagement members placed between the input shaft and the output shaft, the members being mobile between a locked position, wherein the input shaft and the output shaft cooperate in rotation, and an unlocked position, wherein the input shaft does not cooperate with the output shaft, a position-copier solidly attached to the actuator, the copier having an input shaft, and a position-copying rod fixed between the output shaft and the input shaft of the copier.

2. The assembly according to claim 1, wherein the input and output shafts of the assembly are substantially coaxial, the input shaft being inserted in a first axial bore of the output shaft, the input shaft of the assembly comprising a second axial bore, and the position-copying rod passing through the second axial bore.

3. The assembly according to claim 2, wherein the position-copying rod is substantially rigid, the input shaft of the copier is substantially coaxial with the input and output shafts of the assembly.

4. The assembly according to claim 1, wherein the engagement/disengagement members comprise at least one housing made in the input shaft of the assembly and at least one orifice passing through the output shaft, at least one locking member being mobile in radial translation between a locking position, wherein the orifice is placed opposite the housing and wherein the member is placed in the housing and the orifice in order to solidly attach the input shaft and the output shaft, and an unlocking position, wherein the member is removed from the housing in order to separate the input shaft from the output shaft.

5. The assembly according to claim 4, wherein the engagement/disengagement member further comprises a control ring placed around the input shaft and the output shaft, the control ring comprising a locking inner wall portion with a diameter that is substantially equal to that of the output shaft and an unlocking inner wall portion with a diameter that is greater than that of the output shaft, the control ring being mobile in axial translation between a locking position, wherein the locking inner wall portion is placed opposite the orifice so as to hold the locking member in the housing and an unlocking position, wherein the unlocking inner wall portion is placed opposite the orifice so as to allow the locking member to come out of the housing during the rotation of the input shaft with regard to the output shaft.

6. The assembly according to claim 5, wherein the locking member is made up of a ball, the ball being capable of coming out of the housing by the rotation of the input shaft when the control ring is in unlocking position.

7. The assembly according to claim 5, wherein the control ring comprises a slope connecting the locking inner wall portion to the unlocking inner wall portion, the slope being arranged to bring the locking member into its locking position when the control ring passes from its unlocking position to its locking position.

8. The assembly according to claim 5, further comprising a spring placed between a radial stop surface provided on the output shaft and the control ring, the spring being compressed when the control ring is in unlocking position.

9. The assembly according to claim 1, wherein the copier comprises a potentiometer.

10. An aircraft comprising at least one assembly according to claim 1.

* * * * *